Oct. 2, 1923.
C. COLOMBANI
SPRING CLIP
Filed Nov. 17, 1920
1,469,623
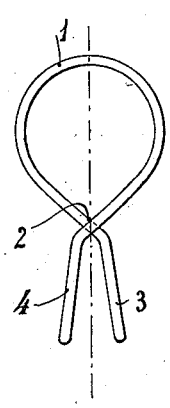
Fig.1.
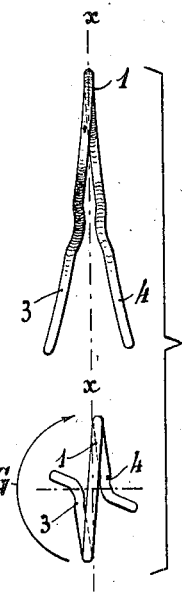
Fig.2.
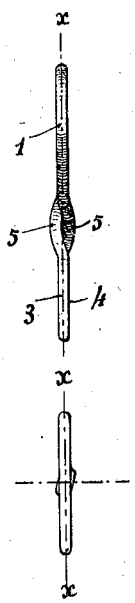
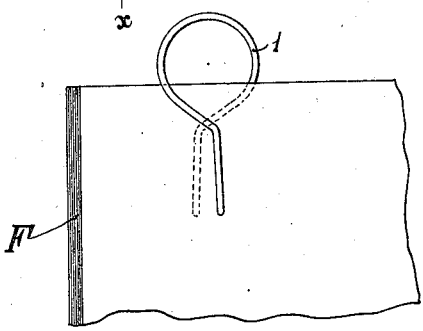
Fig.3.
Fig.4. Fig.5. Fig.6. Fig.7.
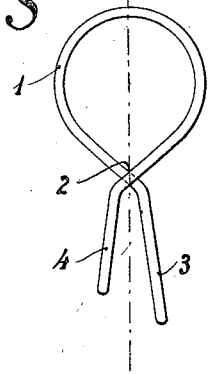
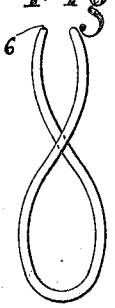
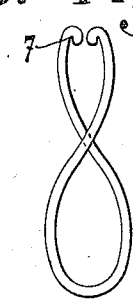
Inventor-
Colomban Colombani.
By B. Singer.
Atty Patented Oct. 2, 1923.

1,469,623

UNITED STATES PATENT OFFICE.

COLOMBAN COLOMBANI, OF BONDY, FRANCE, ASSIGNOR TO JEAN M. A. DARLIN, OF PARIS, FRANCE.

SPRING CLIP.

Application filed November 17, 1920. Serial No. 424,780.

*To all whom it may concern:*

Be it known that I, COLOMBAN COLOMBANI, a French citizen, of 46 Avenue de la Republique, Bondy, Department of the Seine, in the Republic of France, have invented certain new and useful Improvements in or Relating to Spring Clips (for which I have filed an application in France, April 1, 1920, Serial No. 4366); and I do declare the following to be a full, clear, and exact description of the invention, such as will enable others skilled in the art to which it appertains to make and use the same.

My invention relates to spring clips for use in gripping, securing and fastening papers, linen, fabric or other material and to all thin objects whatever their form such as sheets of paper, bank-notes, cheques, accounts, coupons, etc.

In order that the invention may be clearly understood reference is made to the accompanying drawing whereon:—

Figure 1 shews in front elevation, edge view and plan view of a spring clip in the open or non-gripping position, Figure 2 shews an elevation, edge view and plan of the spring clip in the gripping position, Figure 3 shews the spring clip attached to and gripping several sheets of paper, Figures 4, 5, 6 and 7 shew several modifications of the spring clip in accordance with the invention.

Referring to Figures 1 and 2, the spring clip is formed of a piece of metallic wire, preferably of steel bent at the middle to form a loop 1 or ring, the ends 3, 4 of the bent wire being crossed as shewn and twisted or bent slightly out of the plane of the ring or loop so that the ends of the wire when not in use tend to spread themselves apart in a direction at right angles to the plane of the ring or loop.

The legs of the clip are kinked where they cross as shewn at 2 and the ends of the legs may be smooth, rounded straight or corrugated, the latter effect being so produced that the corrugations lie in a plane parallel to the plane of the loop or ring. One end or both ends may be formed with an eye or eyes or be provided with a knob or head analogous to the head of an ordinary pin as shewn respectively in Figures 6 and 7 so as to increase the gripping effect of the clip legs on the sheets of paper whilst at the same time decreasing their liability to damage or injure the sheets.

It will be seen by referring to Figure 1 that when the clip is open or free the head of the loop 1 is inclined relatively to the vertical axis $x, x$, and that the legs 3 and 4 are bent outwardly therefrom to the right and left respectively. This twisting or disalignment of the legs has for its object to form an opening for the easy introduction of the sheets of paper F or other thin material between the legs of the clip and also to permit of the deformation of the clip to effect gripping.

The spring clip being free or open it is sufficient after the introduction of the paper or other sheets to effect a twist on the loop 1 or ring from left to right as indicated by the arrow G (Figure 1 plan) in order to obtain the gripping action.

By this twist of 180° the legs 3 and 4 are reversed, Figure 2 thereby providing a strong gripping effect at the crossing points 2, where they bear on each other perpendicularly to their common plane. In this gripping position the loop 1 or ring and the legs 3 and 4 are disposed symmetrically relatively to the vertical axis $x, x$. This demonstrates clearly the torsional effect of the legs on each other which act as pivots when twisting.

The clip at the point of crossing 2 of the legs is slightly kinked or twisted as at 5 which permits of the legs of the clip being moved into a position such that they lie in the same plane. This arrangement and construction further permits of deforming or bending in order to secure them more easily and to retain them better in the gripped position.

In Figure 4 one leg 4 of the clip is shewn shorter than the other leg 3 whilst still retaining the characteristic features above described with reference to Figures 1 and 2.

Figures 5 to 7 shew various modifications of clips embracing the same characteristic features of Figures 1 and 2. Figures 5 and 7 shew clips in the form of an open figure 8 while Figure 6 shews a clip in the form of a closed figure 8. The legs in all these constructions may be of equal or unequal length and may have rounded ends as at 6 or eyelet or inwardly turned ends, as at 7; or the said ends may have small heads or knobs as at 8, Figure 7, analogous to the head of a pin.

The clip is not limited to the form shewn; they may be of any other suitable form, dimensions and resistance and of suitable metal without departing from the nature of the invention.

What I claim is:

A spring wire clip comprising a loop open on one side and arms extending directly from the loop at the open side and arranged in crossed relation and provided with substantially parallel terminal portions, the said arms and corresponding parts of the loop being normally held by the tension of the loop in planes which diverge from the center of the loop to admit sheets of paper or the like between the crossed portions of the arms and said loop being put under tension, when turned through 180 degrees to reverse the position of the arms, and causing the said parallel terminal portions of the arms and their crossed portions to firmly bind on opposite sides of the paper.

In testimony whereof I affix my signature.

COLOMBANI, COLOMBAN.